US012747348B2

(12) United States Patent
Jeon et al.

(10) Patent No.: US 12,747,348 B2
(45) Date of Patent: Sep. 29, 2026

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Jiyoon Jeon, Daejeon (KR); Bong Keun Ahn, Daejeon (KR); Min Jung Kim, Daejeon (KR); Jangwon Park, Daejeon (KR); Eunji Lee, Daejeon (KR); Seyong Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 380 days.

(21) Appl. No.: 18/565,896

(22) PCT Filed: May 31, 2023

(86) PCT No.: PCT/KR2023/007428

§ 371 (c)(1),
(2) Date: Nov. 30, 2023

(87) PCT Pub. No.: WO2023/243908

PCT Pub. Date: Dec. 21, 2023

(65) Prior Publication Data

US 2025/0115753 A1 Apr. 10, 2025

(30) Foreign Application Priority Data

Jun. 15, 2022 (KR) ........................ 10-2022-0072524

(51) Int. Cl.
*C08L 53/00* (2006.01)
*C08L 33/06* (2006.01)

(52) U.S. Cl.
CPC ............. *C08L 53/00* (2013.01); *C08L 33/062* (2013.01); *C08L 2203/30* (2013.01); *C08L 2205/025* (2013.01); *C08L 2205/03* (2013.01); *C08L 2207/53* (2013.01)

(58) Field of Classification Search
CPC .... C08L 53/00; C08L 33/062; C08L 2203/30; C08L 2205/025; C08L 2205/03; C08L 2207/53; C08L 33/12; C08L 51/04; C08L 25/12; C08F 265/04; C08F 285/00; C08F 212/12; C08F 265/06
See application file for complete search history.

(56) References Cited

U.S. PATENT DOCUMENTS 3,944,631 A 3/1976 Yu et al.

FOREIGN PATENT DOCUMENTS

| | | | | |
|---|---|---|---|---|
| CA | 2266513 | A1 * | 3/1998 | ............ C08L 51/003 |
| EP | 4 194 507 | A1 | 6/2023 | |
| JP | S57-185340 | A | 11/1982 | |
| JP | 2014-516104 | A | 7/2014 | |
| JP | 2014-527570 | A | 10/2014 | |
| JP | 2016-172807 | A | 9/2016 | |
| JP | 2022-552188 | A | 12/2022 | |
| JP | 2023-503073 | A | 1/2023 | |
| JP | 2024-526965 | A | 7/2024 | |
| KR | 10-0201985 | B1 | 6/1999 | |
| KR | 10-2006-0118156 | A | 11/2006 | |
| KR | 10-2013-0075793 | A | 7/2013 | |
| KR | 10-1333578 | B1 | 11/2013 | |
| KR | 10-2014-0096748 | A | 8/2014 | |
| KR | 10-2015-0123709 | A | 11/2015 | |
| KR | 10-2021-0087171 | A | 7/2021 | |
| KR | 10-2022-0020200 | A | 2/2022 | |
| TW | 202202538 | A | 1/2022 | |
| TW | 202212386 | A | 4/2022 | |
| WO | 2023/068526 | A1 | 4/2023 | |

OTHER PUBLICATIONS

The Extended European Search Report for European Patent Application No. 23818215.8, dated Dec. 4, 2024.

* cited by examiner

*Primary Examiner* — Taiwo Oladapo
(74) *Attorney, Agent, or Firm* — ROTHWELL, FIGG, ERNST & MANBECK, P.C.

(57) ABSTRACT

A thermoplastic resin composition includes an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) including an alkyl (meth)acrylate, an alkyl-substituted styrene-based compound, and a vinyl cyanide compound.

15 Claims, No Drawings

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATION

This application is a National Phase of International Application No. PCT/KR2023/007428 which claims priority to Korean Patent Application No. 10-2022-0072524, filed on Jun. 15, 2022, in the Korean Intellectual Property Office, the disclosure of which is incorporated herein by reference.

TECHNICAL FIELD

The present invention relates to a thermoplastic resin composition, a method of preparing the same, and a molded article manufactured using the same. More particularly, the present invention relates to a thermoplastic resin composition having excellent transparency, gloss, blackness, weather resistance, heat resistance, and impact resistance by adjusting the composition and composition ratio of each layer of a graft copolymer having a polymer seed, a rubber core surrounding the seed, and a graft shell surrounding the core, adjusting the morphology of the rubber core, and adjusting the refractive index difference between the graft copolymer and a matrix polymer, a method of preparing the thermoplastic resin composition, and a molded article manufactured using the thermoplastic resin composition.

BACKGROUND ART

Since an acrylate-styrene-acrylonitrile graft copolymer (hereinafter referred to as “ASA resin”) does not contain unstable double bonds, the ASA resin has excellent weather resistance. Accordingly, ASA resins are applied to various fields such as electric/electronic parts, building materials (e.g., vinyl siding, etc.), extruded profiles, and automobile parts. Recently, in the field of outdoor products, market demand for high value-added products having properties such as unpainted, transparent, high chroma, and special colors is continuously increasing.

To implement transparency in a graft copolymer containing a rubber core, the refractive index difference between the rubber core, a graft shell, and a matrix resin should be small. In addition, to implement transparency in a resin composition containing a graft copolymer and a matrix resin, the refractive index difference between a rubber core and the matrix resin should be small. In this case, transparency is realized in the resin composition by preventing refraction and reflection of light at the interface of the graft copolymer.

In an ASA resin containing a butyl acrylate rubber core and a styrene-acrylonitrile copolymer shell, the refractive index of the butyl acrylate rubber is 1.46, and the refractive index of the styrene-acrylonitrile copolymer is 1.56 to 1.58. That is, the refractive index difference between the core and the shell is large, which makes the resin opaque. In addition, when a styrene-acrylonitrile copolymer (hereinafter referred to as “SAN resin”) as a matrix resin is included in an ASA resin, the refractive index of the SAN resin is 1.56 to 1.58, and the refractive index difference between the core of the ASA and the SAN resin is large. Thus, the resin composition is opaque and has poor heat resistance.

Therefore, there is necessary to develop a resin composition capable of realizing a level of transparency required in the market by reducing the refractive index difference between a matrix resin and each of the seed, core, and shell constituting an ASA resin and having excellent gloss, blackness, weather resistance, heat resistance, and mechanical properties.

RELATED ART DOCUMENTS

Patent Documents

KR 2006-0118156 A

DISCLOSURE

Technical Problem

Therefore, the present invention has been made in view of the above problems, and it is one object of the present invention to provide a thermoplastic resin composition having excellent transparency, gloss, blackness, weather resistance, heat resistance, and impact resistance, a method of preparing the same, and a molded article manufactured using the same.

The above and other objects can be accomplished by the present invention described below.

Technical Solution

I) In accordance with one aspect of the present invention, provided is a thermoplastic resin composition including an alkyl acrylate-aromatic vinyl compound-vinyl cyanide compound graft copolymer (A) including a seed, a rubber core surrounding the seed, and a graft shell surrounding the rubber core; and a non-graft copolymer (B) including an alkyl (meth)acrylate, an alkyl-substituted styrene-based compound, and a vinyl cyanide compound, wherein the graft copolymer (A) satisfies Equation 1 below; when acetone is added to the thermoplastic resin composition and stirring and centrifugation are performed so that the thermoplastic resin composition is separated into a sol and a gel, a refractive index difference between the sol and the gel is 0.006 or less; the thermoplastic resin composition has a haze of 10% or less as measured using a 3 mm thick injection specimen according to ASTM D1003; and the thermoplastic resin composition has an Izod impact strength of 10 kgf·cm/cm or more as measured at room temperature using a ¼" thick specimen according to ASTM D256:

$$180 \leq 2 * r2 \leq 300, \quad \text{[Equation 1]}$$

wherein r2 is a thickness (nm) from a center of the graft copolymer to the core.

II) In accordance with another aspect of the present invention, provided is a thermoplastic resin composition including an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) including an alkyl (meth)acrylate, an alkyl-substituted styrene-based compound, and a vinyl cyanide compound, wherein the graft copolymer (A) satisfies both Equations 1 and 2 below:

$$180 \le 2*r2 \le 300 \quad \text{[Equation 1]}$$

$$25 \le r2 - r1 \le 45, \quad \text{[Equation 2]}$$

Wherein, in Equations 1 and 2, r1 is an average radius (nm) from a center of the graft copolymer to the polymer seed, and r2 is an average radius (nm) from a center of the graft copolymer to the rubber core.

III) In I) or II), in the graft copolymer (A), a refractive index difference between the rubber core and the shell may be preferably 0.09 or less.

IV) In I) or II), a refractive index difference between the polymer seed of the graft copolymer (A) and the non-graft copolymer (B) may be preferably 0.012 or less.

V) In I) to IV), based on 100% by weight in total of the graft copolymer (A), the graft copolymer (A) may preferably include 5 to 35% by weight of the polymer seed, 25 to 55% by weight of the rubber core, and 25 to 55% by weight of the graft shell.

VI) In I) to V), the non-graft copolymer (B) may preferably include 30 to 60% by weight of an alkyl (meth)acrylate, 25 to 55% by weight of an alkyl-substituted styrene-based compound, and 5 to 35% by weight of a vinyl cyanide compound.

VII) In I) to VI), the thermoplastic resin composition may preferably include 10 to 90% by weight of the graft copolymer (A) and 10 to 90% by weight of the non-graft copolymer (B).

VIII) In I) to VII), the thermoplastic resin composition may preferably include an alkyl acrylate-aromatic vinyl compound-vinyl cyanide compound graft copolymer (C) containing a rubber core having an average particle diameter of 50 to 150 nm.

IX) In II) to VIII), when acetone is added to the thermoplastic resin composition and stirring and centrifugation are performed so that the thermoplastic resin composition is separated into a sol and a gel, a refractive index difference between the sol and the gel may be preferably 0.006 or less.

X) In II) to IX), the thermoplastic resin composition may preferably have a haze of 10% or less as measured using a 3 mm thick injection specimen according to ASTM D1003.

XI) In I) to X), the thermoplastic resin composition may preferably have a gloss of 120 or more as measured at 450 using a 3 mm thick injection specimen according to ASTM D2457.

XII) In II) to XI), the thermoplastic resin composition may preferably have an Izod impact strength of 10 kgf·cm/cm or more as measured at room temperature using a ¼" thick specimen according to ASTM D256.

XIII) In accordance with still another aspect of the present invention, provided is a method of preparing a thermoplastic resin composition, the method including kneading and extruding, at 180 to 300° C. and 80 to 400 rpm, an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) including an alkyl (meth)acrylate, an alkyl-substituted styrene-based compound, and a vinyl cyanide compound, wherein the graft copolymer (A) satisfies both Equations 1 and 2 below:

$$180 \le 2*r2 \le 300 \quad \text{[Equation 1]}$$

$$25 \le r2 - r1 \le 45, \quad \text{[Equation 2]}$$

wherein, in Equations 1 and 2, r1 is a thickness (nm) from a center of the graft copolymer to the seed, and r2 is a thickness (nm) from a center of the graft copolymer to the core.

XIV) In XIII), in the kneading and extruding, an alkyl acrylate-aromatic vinyl compound-vinyl cyanide compound graft copolymer (C) containing a rubber core having an average particle diameter of 50 to 150 nm may be preferably included.

XV) In accordance with yet another aspect of the present invention, provided is a molded article including the thermoplastic resin composition of I) to XII).

Advantageous Effects

According to the present invention, the present invention has an effect of providing a thermoplastic resin composition having excellent heat resistance, impact resistance, transparency, gloss, blackness, and weather resistance, a method of preparing the same, and a molded article manufactured using the same.

In addition, the thermoplastic resin composition of the present invention can be applied to automotive interior materials, automotive exterior materials, building materials, home appliances, or medical parts requiring excellent transparency, gloss, blackness, weather resistance, heat resistance, and impact resistance and can provide an aesthetically pleasing appearance and excellent impact resistance.

BEST MODE

Hereinafter, a thermoplastic resin composition of the present invention, a method of preparing the same, and a molded article manufactured using the same will be described in detail.

The present inventors confirmed that, to improve the transparency, gloss, blackness, weather resistance, heat resistance, and impact resistance of a thermoplastic resin composition including an ASA resin and a matrix resin, when the composition, composition ratio, and refractive index difference of a seed, core, and shell constituting the ASA resin were adjusted within a predetermined range and the refractive index difference between the ASA resin and the matrix resin was reduced, heat resistance was secured, and impact resistance, transparency, gloss, blackness, and weather resistance were greatly improved. Based on these results, the present inventors conducted further studies to complete the present invention.

The thermoplastic resin composition of the present invention includes an alkyl acrylate-aromatic vinyl compound-vinyl cyanide compound graft copolymer (A) including a seed, a rubber core surrounding the seed, and a graft shell surrounding the rubber core; and a non-graft copolymer (B) including an alkyl (meth)acrylate, an alkyl-substituted styrene-based compound, and a vinyl cyanide compound, wherein the graft copolymer (A) satisfies Equation 1 below; when acetone is added to the thermoplastic resin composition and stirring and centrifugation are performed so that the thermoplastic resin composition is separated into a sol and a gel, the refractive index difference between the sol and the gel is 0.006 or less; the thermoplastic resin composition has a haze of 10% or less as measured using a 3 mm thick injection specimen according to ASTM D1003; and the thermoplastic resin composition has an Izod impact strength of 10 kgf·cm/cm or more as measured at room temperature using a 1/4" thick specimen according to ASTM D256. In this case, gloss, blackness, weather resistance, and heat resistance may be excellent.

$$180 \le 2*r2 \le 300 \quad \text{[Equation 1]}$$

In Equation 1, r2 is a thickness (nm) from the center of the graft copolymer to the core.

In addition, the thermoplastic resin composition of the present invention includes an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) including an alkyl (meth)acrylate, an alkyl-substituted styrene-based compound, and a vinyl cyanide compound, wherein the graft copolymer (A) satisfies both Equations 1 and 2 below. In this case, transparency, gloss, blackness, weather resistance, heat resistance, and impact resistance may be excellent.

$$180 \le 2*r2 \le 300 \quad \text{[Equation 1]}$$

$$25 \le r2 - r1 \le 45 \quad \text{[Equation 2]}$$

In Equations 1 and 2, r1 is an average radius (nm) from the center of the graft copolymer to the polymer seed, and r2 is an average radius (nm) from the center of the graft copolymer to the core.

Hereinafter, each component of the thermoplastic resin composition of the present invention will be described in detail.

(A) Alkyl Acrylate-Aromatic Vinyl Compound-Vinyl Cyanide Compound Graft Copolymer For example, the graft copolymer (A) may be an alkyl acrylate-aromatic vinyl compound-vinyl cyanide compound graft copolymer including a seed, a rubber core surrounding the seed, and a graft shell surrounding the rubber core. The graft copolymer (A) may preferably include a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate. In this case, heat resistance may be secured, and transparency, gloss, blackness, weather resistance, and impact resistance may be excellent. In addition, since an alkyl acrylate is included in the graft shell, compatibility with the non-graft copolymer (B) may be excellent, and thus physical property balance may be excellent.

Seed

For example, the polymer seed of the graft copolymer (A) may be obtained by polymerizing 35 to 58% by weight of an alkyl acrylate and 42 to 65% by weight of an aromatic vinyl compound, preferably 38 to 50% by weight of an alkyl acrylate and 50 to 62% by weight of an aromatic vinyl compound, more preferably 40 to 47% by weight of an alkyl acrylate and 53 to 60% by weight of an aromatic vinyl compound, still more preferably 42 to 45% by weight of an alkyl acrylate and 55 to 58% by weight of an aromatic vinyl compound. In this case, due to a decrease in the refractive index difference with the non-graft copolymer (B), transparency, gloss, blackness, and weather resistance may be excellent.

For example, the polymer seed of the graft copolymer (A) may have an average particle diameter of 120 to 220 nm, preferably 150 to 190 nm. Within this range, excellent impact resistance, fluidity, transparency, blackness, and weather resistance may be imparted to a finally prepared thermoplastic resin composition.

In the present disclosure, the average particle diameters of the polymer seed, rubber core, and graft shell of the graft copolymer may be measured by measurement methods commonly used in the technical field to which the present invention pertains, such as electron microscopy, without particular limitation. For example, for each of the polymer seed, the rubber core, and the graft shell, upon completion of preparation thereof, a sample is obtained, and the average particle diameter of the sample is measured by dynamic light scattering. Specifically, the average particle diameter is measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; and measurement wavelength: 632.8 nm.

Rubber Core

For example, the rubber core of the graft copolymer (A) may be formed to surround the seed and may be obtained by polymerizing 78 to 91% by weight of an alkyl acrylate and 9 to 22% by weight of an aromatic vinyl compound, preferably 80 to 90% by weight of an alkyl acrylate and 10 to 20% by weight of an aromatic vinyl compound, more preferably 82 to 88% by weight of an alkyl acrylate and 12 to 18% by weight of an aromatic vinyl compound, still more preferably 84 to 87% by weight of an alkyl acrylate and 13 to 16% by weight of an aromatic vinyl compound. In this case, physical property balance, impact resistance, transparency, gloss, blackness, and weather resistance may be excellent.

For example, the rubber core may have an average particle diameter of 180 to 300 nm, preferably 200 to 280 nm, more preferably 230 to 260 nm. Within this range, physical property balance and impact resistance may be excellent.

Graft Shell

For example, the graft shell of the graft copolymer (A) may be formed to surround the rubber core and may be obtained by polymerizing 65 to 82% by weight of an aromatic vinyl compound, 12 to 30% by weight of a vinyl cyanide compound, and 3 to 15% by weight of an alkyl acrylate, preferably 66 to 78% by weight of an aromatic vinyl compound, 14 to 26% by weight of a vinyl cyanide compound, and 3 to 13% by weight of an alkyl acrylate, more preferably 68 to 78% by weight of an aromatic vinyl compound, 16 to 22% by weight of a vinyl cyanide compound, and 5 to 12% by weight of an alkyl acrylate, still more preferably 70 to 75% by weight of an aromatic vinyl compound, 18 to 21% by weight of a vinyl cyanide compound, and 6 to 10% by weight of an alkyl acrylate. In this case, since an alkyl acrylate is included in the graft shell, compatibility with the non-graft copolymer (B) may be excellent, and thus physical property balance, transparency, gloss, blackness, and weather resistance may be excellent.

In the present disclosure, for example, the aromatic vinyl compound may include one or more selected from the group consisting of styrene, α-methyl styrene, o-methyl styrene, ρ-methyl styrene, m-methyl styrene, ethyl styrene, isobutyl styrene, t-butyl styrene, o-bromostyrene, ρ-bromostyrene, m-bromostyrene, o-chlorostyrene, ρ-chlorostyrene, m-chlorostyrene, vinyltoluene, vinylxylene, fluorostyrene, and vinylnaphthalene, preferably styrene.

In the present disclosure, for example, the vinyl cyanide compound may include one or more selected from the group consisting of acrylonitrile, methacrylonitrile, ethylacrylonitrile, and isopropylacrylonitrile, preferably acrylonitrile.

In the present disclosure, for example, the alkyl acrylate may include an alkyl acrylate containing an alkyl group having 1 to 15 carbon atoms, preferably one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, more preferably an alkyl acrylate containing an alkyl group having 1 to 4 carbon atoms, still more preferably n-butyl acrylate, 2-ethylhexyl acrylate, or a mixture thereof.

For example, the graft copolymer (A) satisfies both Equations 1 and 2 below. In this case, the thickness of the rubber core of the graft copolymer (A) having a large refractive index difference with the non-graft copolymer (B) may be reduced, and thus transparency, gloss, blackness, weather resistance, and impact resistance may be excellent.

$$180 \le 2*r2 \le 300 \quad \text{[Equation 1]}$$

$$25 \le r2 - r1 \le 45 \quad \text{[Equation 2]}$$

In Equations 1 and 2, r1 is an average radius (mm) from the center of the graft copolymer to the polymer seed, and r2 is an average radius (nm) from the center of the graft copolymer to the core.

Equation 1 may be expressed as preferably 200≤2*r2≤280, more preferably 230≤2*r2≤260. Within this range, impact resistance may be excellent.

Equation 2 may be expressed as preferably 30≤2-r1≤40, more preferably 32≤r2-r1≤37. Within this range, transparency, blackness, and weather resistance may be excellent.

In addition, r1 may be a value obtained by dividing the average particle diameter of the seed by half, and r2 may be a value obtained by dividing the average particle diameter of the core including the seed by half.

r2-r1 means the thickness of the rubber core. As the thickness of the rubber core decreases, light transmittance increases. In this case, transparency may be improved, and blackness and weather resistance may be excellent.

In the present disclosure, the refractive index of each of the polymer seed, rubber core, and graft shell of the graft copolymer and the refractive index of the non-graft copolymer (B) may be calculated by Equation 3 below.

$$RI = \sum Wti * RIi \quad \text{[Equation 3]}$$

Wti=Weight fraction (%) of each component in copolymer

RIi=Refractive index of polymer of each component of copolymer

In the present disclosure, the refractive index of each component of the copolymer, i.e., the refractive index of the polymer of the monomer, is not particularly limited as long as the refractive index is a value commonly recognized in the art to which the present invention pertains. For example, methyl methacrylate may be 1.49, butyl acrylate may be 1.46, styrene may be 1.592, and acrylonitrile may be 1.52.

For example, the refractive index difference between the polymer seed of the graft copolymer (A) and the non-graft copolymer (B) may be 0.012 or less, preferably 0.007 or less, more preferably 0.004 or less, still more preferably 0.003 or less, still more preferably 0.001 to 0.003. Within this range, transparency, gloss, blackness, and weather resistance may be excellent.

For example, the refractive index difference between the rubber core of the graft copolymer (A) and the graft shell of the graft copolymer (A) may be 0.09 or less, preferably 0.070 to 0.090, more preferably 0.080 to 0.090, still more preferably 0.083 to 0.089. Within this range, transparency, light resistance, blackness, weather resistance, and impact resistance may be excellent.

For example, the graft copolymer (A) may have a gel content of 70 to 98% by weight, preferably 80 to 95% by weight, more preferably 82 to 92% by weight. Within this range, mechanical properties such as impact resistance may be excellent.

For example, the graft copolymer (A) may have a swelling index of 2.5 to 10, preferably 3 to 7, more preferably 4 to 6. Within this range, mechanical properties, such as impact resistance, and weather resistance may be excellent.

For example, the graft copolymer (A) may have a grafting degree of 30% or more, preferably 35 to 70%, more preferably 35 to 60%. Within this range, mechanical properties, such as impact resistance, and weather resistance may be excellent.

In the present disclosure, when measuring gel content, swelling index, and grafting degree, 30 g of acetone is added to 0.5 g of a powdered graft copolymer, agitation is performed at 210 rpm and room temperature for 12 hours using a shaker (SKC-6075, Lab Companion Co.), centrifugation is performed at 18,000 rpm and 0° C. for 3 hours using a centrifuge (Supra R30, Hanil Science Co.) to separate only insoluble matter that is not dissolved in acetone, and the separated insoluble matter is dried via forced circulation at 85° C. for 12 hours using a forced convection oven (OF-12GW, Lab Companion Co.). Then, the weight of the dried insoluble matter is measured, and gel content, swelling index, and grafting degree are calculated by Equations 4, 5, and 6 below.

$$\text{Gel content (wt \%)} = [\text{Weight } (g) \text{ of insoluble matter (gel)/Weight } (g) \text{ of sample}] \times 100 \quad \text{[Equation 4]}$$

$$\text{Swelling index} = \text{Weight } (g) \text{ of insoluble matter before drying after centrifugation/Weight } (g) \text{ of insoluble matter after drying after centrifugation} \quad \text{[Equation 5]}$$

$$\text{Grafting degree (\%)} = [\text{Weight } (g) \text{ of grafted monomers/Weight } (g) \text{ of rubber}] \times 100 \quad \text{[Equation 6]}$$

In Equation 6, the weight (g) of grafted monomers is a value obtained by subtracting the weight (g) of rubber from the weight (g) of insoluble matter (gel) obtained by dissolving a graft copolymer in acetone and performing centrifugation, and the weight (g) of rubber is the weight (g) of rubber components theoretically included in the graft copolymer powder.

For example, based on 100% by weight in total of the graft copolymer (A), the graft copolymer (A) may include the polymer seed in an amount of 5 to 35% by weight, preferably 10 to 30% by weight, more preferably 15 to 25% by weight. Within this range, impact resistance and physical property balance may be excellent. When the content of the polymer seed is less than the range, transparency, blackness, and weather resistance may deteriorate. When the content of the polymer seed exceeds the range, impact resistance may deteriorate.

For example, based on 100% by weight in total of the graft copolymer (A), the graft copolymer (A) may include the rubber core in an amount of 25 to 55% by weight, preferably 30 to 50% by weight, more preferably 35 to 45% by weight. Within this range, impact resistance and physical property balance may be excellent. When the content of the rubber core is less than the range, the impact reinforcement effect of the graft copolymer may be reduced due to decrease in rubber content. When the content of the rubber core exceeds the range, agglomeration of rubber may occur during coagulation due to decrease in graft shell content, and compatibility with the non-graft copolymer (B) may be significantly reduced. As a result, the impact reinforcement effect may be reduced, and the desired degree of refractive index may not be obtained.

For example, based on 100% by weight in total of the graft copolymer (A), the graft copolymer (A) may include the graft shell in an amount of 25 to 55% by weight, preferably 30 to 50% by weight, more preferably 35 to 45% by weight. Within this range, impact resistance and physical property balance may be excellent. When the content of the graft shell is less than the range, due to low grafting efficiency, rubber may be agglomerated, and thus compatibility with the non-graft copolymer (B) may be reduced, thereby reducing the impact reinforcement effect. When the content of the graft shell exceeds the range, due to decrease in relative rubber content, impact resistance may be reduced.

For example, the core of the rubber component may be acrylic rubber obtained by polymerizing an alkyl acrylate, an aromatic vinyl compound, and a crosslinking agent. When the crosslinking agent is included, the gel content may be adjusted, and impact resistance may be excellent.

For example, the polymer seed, the rubber core, or both may include one or more selected from the group consisting of divinylbenzene, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, ethyleneglycol dimethacrylate, diethyleneglycol dimethacrylate, triethyleneglycol dimethacrylate, neopentyl glycol dimethacrylate, triallyl isocyanurate, triarylamine, diallylamine, and a compound represented by Chemical Formula 1 below as the crosslinking agent.

[Chemical Formula 1]

$$A \mathord{-}\!\!\left[ R - O \right]_n\!\!\mathord{-} A'$$

In Chemical Formula 1, A is independently a substituent having a vinyl group, or a (meth)acrylate group; A' is a hydrogen group, a substituent having a vinyl group, an alkyl group having 1 to 30 carbon atoms, an allylalkyl group having 5 to 24 carbon atoms, an arylamine group having 5 to 24 carbon atoms, or an allyl group having 6 to 30 carbon atoms; R is independently a divalent ethyl or propyl group; and n is an integer of 0 to 15 or 1 to 15, preferably 0 to 5 or 1 to 5, more preferably 0 to 4 or 1 to 4.

For example, based on 100 parts by weight in total of monomers used when each of the polymer seed, rubber core, and graft shell of the graft copolymer (A) is prepared, the crosslinking agent may be used in an amount of 0.001 to 3 parts by weight, preferably 0.05 to 1 part by weight.

In the present disclosure, the content of a monomer in a polymer may mean a content (% by weight) of the monomer fed when the polymer is prepared, or may mean a value (% by weight) calculated by converting a unit in the polymer into the monomer.

For example, a method of preparing the graft copolymer (A) may include step i) of preparing a polymer seed by including 35 to 58% by weight of an alkyl acrylate and 42 to 65% by weight of an aromatic vinyl compound; step ii) of preparing a rubber core by including 78 to 91% by weight of an alkyl acrylate and 9 to 22% by weight of an aromatic vinyl compound in the presence of the polymer seed; and step iii) of preparing a graft copolymer by graft-polymerizing 65 to 82% by weight of an aromatic vinyl compound, 12 to 30% by weight of a vinyl cyanide compound, and 3 to 15% by weight of an alkyl acrylate in the presence of the rubber core. In this case, transparency, gloss, blackness, weather resistance, and impact resistance may be excellent.

The method of preparing the graft copolymer (A) preferably includes step i) of preparing a polymer seed by including 35 to 58% by weight of an alkyl acrylate, 42 to 65% by weight of an aromatic vinyl compound, an electrolyte, a crosslinking agent, an initiator, and an emulsifier; step ii) of preparing a rubber core by including 78 to 91% by weight of an alkyl acrylate, 9 to 22% by weight of an aromatic vinyl compound, a crosslinking agent, an initiator, and an emulsifier in the presence of the polymer seed; and step iii) of preparing a graft copolymer by graft-polymerizing 65 to 82% by weight of an aromatic vinyl compound, 12 to 30% by weight of a vinyl cyanide compound, 3 to 15% by weight of an alkyl acrylate, a crosslinking agent, an initiator, and an emulsifier in the presence of the rubber core. In this case, transparency, gloss, blackness, and weather resistance may be excellent.

In steps i), ii), and iii), emulsifiers commonly used in the art to which the present invention pertains may be used as the emulsifier of the present invention, without particular limitation. For example, the emulsifier may include one or more selected from the group consisting of an alkyl sulfosuccinate metal salt having 12 to 18 carbon atoms or a derivative thereof, an alkyl sulfate ester having 12 to 20 carbon atoms or a derivative thereof, an alkyl sulfonic acid metal salt having 12 to 20 carbon atoms or a derivative thereof, fatty acid soap, and rosin acid soap.

The alkyl sulfosuccinate metal salt having 12 to 18 carbon atoms or the derivative thereof may include preferably one or more selected from the group consisting of dicyclohexyl sulfosuccinate, dihexyl sulfosuccinate, di-2-ethyl hexyl sulfosuccinate sodium salt, di-2-ethyl hexyl sulfosuccinate potassium salt, dioctyl sulfosuccinate sodium salt, and dioctyl sulfosuccinate potassium salt.

The alkyl sulfate ester having 12 to 20 carbon atoms or the derivative thereof and the alkyl sulfonic acid metal salt having 12 to 20 carbon atoms or the derivative thereof may include preferably one or more selected from the group consisting of sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate.

The fatty acid soap may include preferably one or more selected from the group consisting of sodium or potassium salts of oleic acid, stearic acid, lauric acid, and mixed fatty acids.

The rosin acid soap may be preferably abietate.

For example, based on 100 parts by weight in total of monomers used when each of the polymer seed, rubber core, and graft shell of the graft copolymer (A) is prepared, the emulsifier may be used in an amount of 0.01 to 5 parts by weight, preferably 0.1 to 4 parts by weight, more preferably 1 to 3 parts by weight.

In steps i), ii), and iii), the type of initiator is not particularly limited, but a radical initiator may be preferably used.

For example, the radical initiator may include one or more selected from the group consisting of inorganic peroxides, organic peroxides, peroxyketal peroxides, peroxycarbonate peroxides, and azo compounds.

The inorganic peroxides may include preferably one or more selected from the group consisting of sodium persulfate, potassium persulfate, ammonium persulfate, potassium superphosphate, and hydrogen peroxide.

The organic peroxides may include one or more selected from the group consisting of t-butyl peroxide, cumene hydroperoxide, ρ-menthane hydroperoxide, di-t-butyl peroxide, dicumyl peroxide, t-butylcumyl peroxide, 2,5-dimethyl-2,5-di(t-butylperoxy)-hexane, di-t-amyl peroxide, 1,1-di(t-butylperoxy)-3,3,5-trimethylcyclohexane, 1,1-di(t-butylperoxy)-cyclohexane, 1,1-di(t-amylperoxy)-cyclohexane, ethyl 3,3-di(t-amylperoxy)-butyrate, diisopropylbenzene mono-hydroperoxide, t-amyl hydroperoxide, t-butyl hydroperoxide, t-butyl peroxyneodecanoate, t-butyl peroxypivalate, di-(3,3,5-trimethylhexanoyl)-peroxide, t-butyl peroxy-2-ethylhexanoate, t-butyl peroxy-3,3,5-trimethylhexanoyl, t-amyl peroxy neodecanoate, t-amyl peroxy pivalate, t-amyl peroxy-2-ethylhexanoate, t-butyl peroxyacetate, t-butyl peroxybenzoate, t-amyl peroxy 2-ethylhexyl carbonate, t-butyl peroxy 2-ethylhexyl carbonate, t-butyl peroxy isopropyl monocarbonate, t-butyl peroxy maleic acid, cumyl peroxyneodecanoate, 1,1,3,3,-tetramethylbutyl peroxy neodecanoate, 1,1,3,3,-tetramethylbutyl peroxy 2-ethylhexanoate, di-2-2ethylhexyl peroxydicarbonate, 3-hydroxy-1,1-dimethylbutylperoxyneodecanoate, acetyl peroxide, isobutyl peroxide, octanoyl peroxide, dibenzoyl peroxide, dilauroyl peroxide, 3,5,5-trimethylhexanol peroxide, and t-butyl peroxy isobutyrate.

The peroxyketal peroxides may include preferably one or more selected from the group consisting of 1,1-di(t-butylperoxy)-3,3,5-trimethylcyclohexane, 1,1-di(t-butylperoxy) cyclohexane, 1,1-di(t-amylperoxy)cyclohexane, ethyl-3,3-di (t-butylperoxy)butyrate, and ethyl-3,3-di(t-amylperoxy) butyrate.

The peroxycarbonate peroxides may include preferably one or more selected from the group consisting of dialkyl peroxides, such as dicumylperoxide, di(t-butylperoxy)-m/ρ-diisopropylbenzene, 2,5-dimethyl-2,5-(t-butylperoxy) hexane, t-butylcumyl peroxide, and 2,5-methyl-2,5-(t-butylperoxy)hexyne-3, t-butyl peroxy 2-ethylhexyl mono carbonate, and t-butyl peroxybenzoate.

The azo compounds may include preferably one or more selected from the group consisting of azobis isobutyronitrile, azobis-2,4-dimethylvaleronitrile, azobiscyclohexanecarbonitrile, and azobis isobutyric acid methyl.

In at least one of steps i), ii), and iii), in combination with the polymerization initiator, an activator may be preferably used to promote the initiation reaction of peroxides.

Activators commonly used in the art to which the present invention pertains may be used as the activator of the present invention without particular limitation.

Based on 100 parts by weight in total of the graft copolymer, the activator may be added in an amount of 0.01 to 3 parts by weight, preferably 0.01 to 1 part by weight. Within this range, a high degree of polymerization may be achieved.

For example, in steps i), ii), and iii), in combination with the initiator, an oxidation-reduction system catalyst may be used to further accelerate the initiation reaction.

For example, the oxidation-reduction system catalyst may include one or more selected from the group consisting of sodium pyrophosphate, dextrose, ferrous sulfide, sodium sulfite, sodium formaldehyde sulfoxylate, and sodium ethylenediaminetetraacetate, preferably a mixture of sodium pyrophosphate, dextrose, and ferrous sulfide, without being limited thereto.

For example, in step i), as the electrolyte, one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_3P_2O_7$, $K_3PO_4$, $Na_3PO_4$, and $Na_2HPO_4$ may be used, without being limited thereto.

For example, in step iii), a molecular weight modifier may be included.

For example, based on 100 parts by weight in total of the graft copolymer, the molecular weight modifier may be included in an amount of 0.01 to 2 parts by weight, preferably 0.05 to 1.5 parts by weight, more preferably 0.05 to 1 part by weight. Within this range, a polymer having a desired molecular weight may be easily prepared.

For example, the molecular weight modifier may include one or more selected from the group consisting of α-methylstyrene dimer, t-dodecyl mercaptan, n-dodecyl mercaptan, octyl mercaptan, carbon tetrachloride, methylene chloride, methylene bromide, tetra ethyl thiuram disulfide, dipentamethylene thiuram disulfide, and diisopropylxanthogen disulfide, without being limited thereto.

In the present disclosure, 100 parts by weight of the graft copolymer may mean the total weight of the finally obtained graft copolymer; the total weight of the monomers used in the preparation of the polymer seed, the rubber core, and the graft shell, considering that most of the added monomers are used for polymerization; or the total weight of the monomers added in the preparation of the polymer seed and the rubber core and the monomers added in the preparation of the graft shell.

For example, the graft copolymer (A) may be prepared by emulsion polymerization. In this case, chemical resistance, weather resistance, fluidity, tensile strength, and impact strength may be excellent.

Emulsion polymerization methods commonly practiced in the art to which the present invention pertains may be used in the present invention without particular limitation.

Polymerization temperature during the emulsion polymerization is not particularly limited, and for example, the emulsion polymerization may be performed at 50 to 85° C., preferably 60 to 80° C.

For example, the latex of the graft copolymer (A) may be prepared in the form of powder through a conventional process including coagulation, washing, and drying. As a specific example, a metal salt or an acid coagulant is added, coagulation is performed at 60 to 100° C., and aging, dehydration, washing, and drying are performed to prepare the latex of the graft copolymer (A) in powder form, but the present invention is not limited thereto.

For example, based on a total weight of the graft copolymer (A) and the non-graft copolymer (B), the graft copolymer (A) may be included in an amount of 10 to 90% by weight, preferably 30 to 70% by weight, more preferably 40 to 60% by weight. Within this range, transparency, gloss, blackness, weather resistance, and impact resistance may be excellent.

(B) Non-Graft Copolymer Including Alkyl (Meth)acrylate, Alkyl-Substituted Styrene-Based Compound, and Vinyl Cyanide Compound The non-graft copolymer (B) may be a matrix resin, and for example, may include an alkyl (meth)acrylate, an alkyl-substituted styrene-based compound, and a vinyl cyanide compound. In this case, compatibility with the graft copolymer (A) may be excellent, and heat resistance may be secured. Thus, transparency, gloss, blackness, weather resistance, and impact resistance may be excellent.

The non-graft copolymer (B) may include preferably 30 to 60% by weight of an alkyl (meth)acrylate, 25 to 55% by weight of an alkyl-substituted styrene-based compound, and 5 to 35% by weight of a vinyl cyanide compound, more preferably 35 to 55% by weight of an alkyl (meth)acrylate, 30 to 50% by weight of an alkyl-substituted styrene-based compound, and 15 to 25% by weight of a vinyl cyanide compound, still more preferably 40 to 47% by weight of an alkyl (meth)acrylate, 35 to 42% by weight of an alkyl-substituted styrene-based compound, and 17 to 23% by weight of a vinyl cyanide compound. Within this range, compatibility with the graft copolymer (A) may be excellent, and heat resistance may be secured. Thus, transparency, gloss, blackness, weather resistance, and impact resistance may be excellent.

In the present disclosure, the term "non-graft copolymer" refers to a copolymer obtained without graft polymerization, and more specifically refers to a copolymer not grafted to rubber.

In the present disclosure, the alkyl (meth)acrylate may be defined as including both alkyl acrylate and alkyl methacrylate.

For example, the alkyl acrylate may include an alkyl acrylate containing an alkyl group having 1 to 15 carbon atoms, preferably one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, more preferably an alkyl acrylate containing an alkyl group having 1 to 4 carbon atoms, still more preferably n-butyl acrylate, 2-ethylhexyl acrylate, or a mixture thereof.

For example, the alkyl methacrylate may be an alkyl methacrylate containing an alkyl group having 1 to 15 carbon atoms, and may preferably include one or more selected from the group consisting of methyl methacrylate, ethyl methacrylate, butyl methacrylate, 2-ethylbutyl methacrylate, 2-ethylhexylmethacrylate, and lauryl methacrylate, more preferably an alkyl methacrylate containing an alkyl group having 1 to 4 carbon atoms, still more preferably methyl methacrylate.

In the present disclosure, for example, the alkyl-substituted styrene-based compound may include one or more selected from the group consisting of α-methyl styrene, ρ-methyl styrene, o-ethyl styrene, m-ethyl styrene, ρ-ethyl styrene, ρ-t-butyl styrene, and 2,4-dimethyl styrene, preferably α-methyl styrene. In this case, heat resistance may be excellent.

The type of the vinyl cyanide compound included in the non-graft copolymer (B) may be the same as the type of the vinyl cyanide compound included in the graft copolymer (A) of the present invention.

The non-graft copolymer (B) may be preferably a methyl methacrylate-α-methyl styrene-acrylonitrile copolymer. In this case, the refractive index difference between the polymer seed of the graft copolymer (A) and the non-graft copolymer (B) may be reduced, and thus transparency, blackness, weather resistance, and heat resistance may be excellent.

For example, the non-graft copolymer (B) may have a weight average molecular weight of 50,000 to 150,000 g/mol, preferably 70,000 to 130,000 g/mol, more preferably 90,000 to 120,000 g/mol. Within this range, impact resistance and moldability may be excellent.

In the present disclosure, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+ 1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the non-graft copolymer (B) may have a glass transition temperature of 110° C. or higher, preferably 115° C. or higher, more preferably 115 to 130° C. as measured according to ASTM D3418. In this case, heat resistance may be further improved.

In the present disclosure, the glass transition temperature may be measured at a heating rate of 10° C./min using a differential scanning calorimeter (TA Instruments, Q100 DSC) according to ASTM D3418.

For example, the non-graft copolymer (B) may have a melt flow index of 8 g/10 min or more, preferably 10 g/10 min or more, more preferably 10 to 20 g/10 min as measured at 220° C. under a load of 10 Kg according to ASTM D1238. Within this range, processability may be excellent.

For example, the non-graft copolymer (B) may have a refractive index of 1.52 to 1.55, preferably 1.53 to 1.54 as measured at room temperature using an Abbe refractometer according to ASTM D542. Within this range, the refractive index difference between the seed of the graft copolymer (A) and the non-graft copolymer (B) may be reduced, and thus transparency, gloss, blackness, and weather resistance may be excellent.

In the present disclosure, the room temperature may be a temperature in the range of 20±5° C.

For example, the non-graft copolymer (B) may be prepared using a method including step i) of feeding a reaction mixture containing 30 to 60% by weight of an alkyl (meth) acrylate, 25 to 55% by weight of an alkyl-substituted styrene-based compound, 5 to 35% by weight of a vinyl cyanide compound, a solvent, and a multifunctional group-containing organic peroxide initiator into a polymerization apparatus and performing polymerization; and step ii) of feeding the polymer reaction solution of step i) into a volatilization tank and volatilizing unreacted monomers and the solvent to separate the polymer.

For example, the non-graft copolymer (B) may be prepared by solution polymerization, bulk polymerization, emulsion polymerization, or suspension polymerization, preferably bulk polymerization. Solution polymerization, bulk polymerization, emulsion polymerization, and suspension polymerization methods commonly practiced in the art to which the present invention pertains may be used in the present invention without particular limitation.

In step i), bulk polymerization may be preferably performed at 100 to 130° C. under the condition of reactor residence time of 6 to 8 hours.

The polymerization apparatus used in the polymerization reaction is not particularly limited, but a continuous polymerization apparatus in which two or more stirred tank reactors are connected in series is preferably used. In this case, the type of reactor is not particularly limited. A first reactor is preferably a stirred tank reactor with a heat exchanger attached to the front end thereof, and a second or more reactor is preferably an evaporative stirred tank reactor including a stirring tank, a reservoir, a condenser, and a pressure control plate.

For example, the solvent may be toluene, methylethyl ketone, or a mixture thereof, preferably toluene. In this case, viscosity may be easily controlled, and decrease in polymerization conversion rate may be suppressed.

For example, the multifunctional group-containing organic peroxide initiator may include one or more selected from the group consisting of 1,1-bis(t-butylperoxy)-3,3,5-trimethylcyclohexane, 1,1-bis(t-butylperoxy)cyclohexane, and 1,1-bis(t-butylperoxy)2-methylcyclohexane. In this case, productivity may be excellent, and the advantage of reduced thermal discoloration may be obtained.

For example, based on 100 parts by weight in total of the alkyl-substituted styrene-based compound, the alkyl (meth) acrylate, and the vinyl cyanide compound, the organic peroxides initiator may be included in an amount of 0.05 to 0.3 parts by weight. Within this range, the effect of increasing polymerization conversion rate and molecular weight may be obtained.

In step ii), bulk polymerization may be performed through conventional volatilization and separation processes in a conventional volatilization tank. For example, a polymer reaction solution polymerized in and discharged from a continuous polymerization apparatus is fed into a first volatilization tank to which a heat exchanger set at a temperature of 100 to 200° C. and a vacuum pressure of 500 to 650 torr is attached, the reaction solution released from the first volatilization tank is fed into a second volatilization tank to which a heat exchanger set at a temperature of 200 to 250° C. and a vacuum pressure of 50 torr or less, preferably 20 to 30 torr is attached, unreacted monomers and a solvent are volatilized, condensation is performed, the condensate is reintroduced as raw material, and a polymer is processed into pellets as the polymer passes through a transfer pump extruder.

In the present disclosure, a polymer including a certain compound means a polymer prepared by polymerizing the compound, and a unit in the polymer is derived from the compound.

For example, based on a total weight of the graft copolymer (A) and the non-graft copolymer (B), the non-graft copolymer (B) may be included in an amount of 10 to 90% by weight, preferably 30 to 70% by weight, more preferably 40 to 60% by weight. Within this range, heat resistance, transparency, gloss, blackness, weather resistance, and impact resistance may be excellent.

(C) Alkyl Acrylate-Aromatic Vinyl Compound-Vinyl Cyanide Compound Graft Copolymer Containing Rubber Core Having Average Particle Diameter of 50 to 150 nm For example, the thermoplastic resin composition may include the alkyl acrylate-aromatic vinyl compound-vinyl cyanide compound graft copolymer (C) containing a rubber core having an average particle diameter of 50 to 150 nm. In this case, compatibility with the non-graft copolymer (B) may be excellent, and transparency, gloss, blackness, and weather resistance may be further improved.

The graft copolymer (C) may be preferably a graft copolymer including a rubber core having an average particle diameter of 50 to 150 nm and including 78 to 91% by weight of an alkyl acrylate and 9 to 22% by weight of an aromatic vinyl compound and a graft shell surrounding the rubber core and including 65 to 80% by weight of an aromatic vinyl compound, 12 to 26% by weight of a vinyl cyanide compound, and 3 to 15% by weight of an alkyl acrylate. In this case, compatibility with the non-graft copolymer (B) may be excellent, impact resistance may be excellent, and transparency, gloss, blackness, and weather resistance may be further improved.

More preferably, the graft copolymer (C) may include a rubber core having an average particle diameter of 70 to 130 nm and including 80 to 90% by weight of an alkyl acrylate and 10 to 20% by weight of an aromatic vinyl compound and a graft shell surrounding the rubber core and including 67 to 78% by weight of an aromatic vinyl compound, 14 to 25% by weight of a vinyl cyanide compound, and 4 to 13% by weight of an alkyl acrylate. In this case, compatibility with the non-graft copolymer (B) may be excellent, impact resistance may be excellent, and transparency, gloss, blackness, and weather resistance may be further improved.

Still more preferably, the graft copolymer (C) may include a rubber core having an average particle diameter of 80 to 110 nm and including 82 to 88% by weight of an alkyl acrylate and 12 to 18% by weight of an aromatic vinyl compound and a graft shell surrounding the rubber core and including 69 to 75% by weight of an aromatic vinyl compound, 16 to 24% by weight of a vinyl cyanide compound, and 5 to 12% by weight of an alkyl acrylate. In this case, compatibility with the non-graft copolymer (B) may be excellent, impact resistance may be excellent, and transparency, gloss, blackness, and weather resistance may be further improved.

For example, the graft copolymer (C) may include 30 to 60% by weight of a rubber core and 40 to 70% by weight of a graft shell, preferably 35 to 55% by weight of a rubber core and 45 to 65% by weight of a graft shell, more preferably 40 to 50% by weight of a rubber core and 50 to 60% by weight of a graft shell. Within this range, mechanical properties may be excellent.

The types of the alkyl acrylate, aromatic vinyl compound, and vinyl cyanide compound included in the graft copolymer (C) may be the same as the types of the alkyl acrylate, aromatic vinyl compound, and vinyl cyanide compound included in the graft copolymer (A) of the present invention.

For example, a method of preparing the graft copolymer (C) may include step i) of preparing a rubber core by including 78 to 91% by weight of an alkyl acrylate and 9 to 22% by weight of an aromatic vinyl compound; and step ii) of preparing a graft copolymer by graft-polymerizing 65 to 80% by weight of an aromatic vinyl compound, 12 to 26% by weight of a vinyl cyanide compound, and 3 to 15% by weight of an alkyl acrylate in the presence of the rubber core. In this case, impact resistance, transparency, gloss, blackness, and weather resistance may be excellent.

Preferably, the method of preparing the graft copolymer (C) may include step i) of preparing a rubber core by including 78 to 91% by weight of an alkyl acrylate, 9 to 22% by weight of an aromatic vinyl compound, a crosslinking agent, an initiator, and an emulsifier; and step iii) of preparing a graft copolymer by graft-polymerizing 65 to 80% by weight of an aromatic vinyl compound, 12 to 26% by weight of a vinyl cyanide compound, 3 to 15% by weight of an alkyl acrylate, a crosslinking agent, an initiator, and an emulsifier in the presence of the rubber core. In this case, transparency, gloss, blackness, and weather resistance may be excellent.

The types of the crosslinking agent, initiator, and emulsifier used in steps i) and/or ii) may be the same as the types of the crosslinking agent, initiator, and emulsifier used in the emulsion polymerization step of the graft copolymer (A) of the present invention.

For example, based on 100% by weight in total of the graft copolymer (A), the non-graft copolymer (B), and the graft copolymer (C), a total weight of the graft copolymer (A) and the graft copolymer (C) may be 10 to 90% by weight, preferably 30 to 70% by weight, more preferably 40 to 60% by weight. Within this range, transparency, gloss, blackness, weather resistance, and impact resistance may be excellent.

For example, a weight ratio (A:C) of the graft copolymer (A) to the graft copolymer (C) may be 5:5 to 8:2, preferably 5.5:4.5 to 7.5:2.5, more preferably 5.5:4.5 to 7:3, still more preferably 5.5:4.5 to 6.5:3.5. Within this range, transparency, gloss, blackness, weather resistance, heat resistance, and impact resistance may be excellent.

Thermoplastic Resin Composition

When acetone is added to the thermoplastic resin composition, and stirring and centrifugation are performed to separate a gel as an insoluble matter and a sol as a soluble matter, the refractive index difference between the gel and the sol may be 0.006 or less, preferably 0.004 or less, more preferably 0.003 or less, still more preferably 0.001 to 0.003. Within this range, transparency, gloss, blackness, and weather resistance may be further improved.

In the present disclosure, specifically, when measuring the refractive index difference between the sol and gel of the thermoplastic resin composition, 30 g of acetone is added to 0.5 g of thermoplastic resin composition pellets, stirring is performed at 210 rpm and room temperature for 12 hours using a shaker (SKC-6075, Lab Companion Co.), and centrifugation is performed at 18,000 rpm and 0° C. for 3 hours using a centrifuge (Supra R30, Hanil Science Co.) to separate a gel insoluble in acetone and a sol soluble in acetone. Then, the gel and the sol are dried via forced circulation at 85° C. for 12 hours using a forced convection oven (OF-12GW, Lab Companion Co.), and the refractive indexes of the gel and the sol are measured according to ASTM D542.

In the present disclosure, specifically, the refractive index is measured at room temperature using an Abbe refractometer according to ASTM D542.

By controlling the refractive index between the sol and the gel in the thermoplastic resin composition within the range, a resin composition having excellent transparency, gloss, blackness, and weather resistance may be provided.

The thermoplastic resin composition may have a haze of preferably 10% or less, more preferably 8% or less, still more preferably 6% or less, still more preferably 5% or less, still more preferably 1 to 5%, still more preferably 1 to 4.5% as measured using a 3 mm thick injection specimen according to ASTM D1003.

The thermoplastic resin composition may have a haze of preferably 4% or less, more preferably 3% or less, still more preferably 2.5% or less, still more preferably 0.1 to 2.5%, still more preferably 0.5 to 2% as measured using an extrusion specimen having a thickness of 0.15 mm according to ASTM D1003. Within this range, physical property balance may be excellent.

In the present disclosure, specifically, the hazes of an injection specimen having a thickness of 3 mm and an extrusion specimen having a thickness of 0.15 mm are measured using a haze meter (HM-150, MURAKAMI Co.) according to ASTM D1003. As a haze value decreases, transparency increases.

The thermoplastic resin composition may have a gloss of preferably 120 or more, more preferably 130 or more, still more preferably 130 to 160, still more preferably 130 to 150, still more preferably 135 to 145 as measured at 450 using an injection specimen having a thickness of 3 mm according to ASTM D2457. Within this range, physical property balance may be excellent.

The thermoplastic resin composition may have a gloss of preferably 110 or more, more preferably 120 or more, still more preferably 120 to 150, still more preferably 120 to 140, still more preferably 125 to 135 as measured at 60° using an extrusion specimen having a thickness of 0.15 mm according to ASTM D2457. Within this range, physical property balance may be excellent.

The thermoplastic resin composition may have an Izod impact strength of preferably 10 kgf·cm/cm or more, more preferably 11 kgf·cm/cm or more, still more preferably 12 kgf·cm/cm or more, still more preferably 13 kgf·cm/cm or more, still more preferably 13 to 20 kgf·cm/cm, still more preferably 14 to 19 kgf·cm/cm as measured at room temperature using a ¼" thick specimen according to ASTM D256. Within this range, physical property balance may be excellent.

The thermoplastic resin composition may have a heat deflection temperature of preferably 85° C. or higher, more preferably 87° C. or higher, still more preferably 88° C. or higher, still more preferably 88 to 100° C. as measured under a load of 18.5 kgf according to ASTM D648. Within this range, physical property balance and heat resistance may be excellent.

The thermoplastic resin composition may have a Vicat softening temperature of preferably 85° C. or higher, more preferably 87° C. or higher, still more preferably 89° C. or higher, still more preferably 89 to 100° C. as measured at a heating rate of 50° C./min under a load of 50 N according to ASTM D1525. Within this range, physical property balance and heat resistance may be excellent.

After leaving a specimen for 3,000 hours in an accelerated weathering tester (Weather-O-Meter, Ci4000, ATLAS Co., xenon arc lamp, Quartz (inner)/S.Boro (outer) filters, irradiance of 0.55 $W/m^2$ at 340 nm) according to SAE J1960, when the degree of discoloration is measured using a color difference meter, and weather resistance (ΔE) is calculated by Equation 7 below, the thermoplastic resin composition may have a weather resistance (ΔE) of preferably 2.8 or less, more preferably 2.6 or less, still more preferably 2.4 or less, still more preferably 0.1 to 2.4, still more preferably 0.5 to 2.2. Within this range, physical property balance may be excellent.

ΔE below is an arithmetic mean value of L, a, and b values of the specimen measured by the CIE LAB color coordinate system before and after the accelerated weathering test. Weather resistance increases as the value of ΔE approaches zero.

$$\Delta E = \sqrt{(L' - L_0)^2 + (a' - a_0)^2 + (b' - b_0)^2} \quad \text{[Equation 7]}$$

In Equation 7, L', a', and b' represent L, a, and b values measured using the CIE LAB color coordinate system after leaving a specimen for 3,000 hours according to SAE J1960, respectively. $L_0$, $a_0$, and $b_0$ represent L, a, and b values measured using the CIE LAB color coordinate system before leaving the specimen, respectively.

Among the values measured for the color of the injection specimen using the CIE LAB color coordinate system, when blackness is evaluated by the L value corresponding to brightness, the thermoplastic resin composition may have a blackness of 25.5 or less, preferably 25 or less, more preferably 0 to 25, still more preferably 5 to 24.5. Within this range, physical property balance may be excellent.

In the present disclosure, the L value has a value between 0 and 100. L=0 indicates black, and L=100 indicates white.

For example, the thermoplastic resin composition may include one or more selected from the group consisting of a lubricant, an antioxidant, and a UV absorber.

For example, the lubricant may include one or more selected from the group consisting of ethylene bis stearamide, oxidized polyethylene wax, magnesium stearate, calcium stearamide, and stearic acid. In this case, heat resistance and fluidity may be improved.

For example, based on 100 parts by weight in total of the graft copolymer (A) and the non-graft copolymer (B), the lubricant may be included in an amount of 0.01 to 3 parts by weight, preferably 0.05 to 2 parts by weight.

For example, the antioxidant may include a phenolic antioxidant, a phosphorus antioxidant, or a mixture thereof, preferably a phenolic antioxidant. In this case, oxidation by heat may be prevented during an extrusion process, and mechanical properties and heat resistance may be excellent.

For example, based on 100 parts by weight in total of the graft copolymer (A) and the non-graft copolymer (B), the antioxidant may be included in an amount of 0.01 to 3 parts by weight, preferably 0.05 to 2 parts by weight. Within this range, physical property balance may be excellent, and heat resistance may be improved.

For example, the UV absorber may include one or more selected from the group consisting of a triazine-based UV absorber, a benzophenone-based UV absorber, a benzotriazole-based UV absorber, a benzoate-based UV absorber, and a cyanoacrylate-based UV absorber, without being limited thereto.

For example, based on 100 parts by weight in total of the graft copolymer (A) and the non-graft copolymer (B), the UV absorber may be included in an amount of 0.01 to 3 parts by weight, preferably 0.05 to 2 parts by weight. In this case, physical property balance may be excellent, and light resistance may be improved.

For example, the thermoplastic resin composition may include one or more additives selected from the group consisting of a flame retardant, a flame retardant aid, a fluorescent brightening agent, an antistatic agent, a chain extender, a release agent, a pigment, a dye, an antibacterial agent, a processing aid, a metal deactivator, a smoke inhibitor, an inorganic filler, glass fiber, an anti-friction agent, and an anti-wear agent.

For example, based on 100 parts by weight in total of the graft copolymer (A) and the non-graft copolymer (B), each additive may be included in an amount of 0.01 to 5 parts by weight, preferably 0.1 to 3 parts by weight, more preferably 0.1 to 1 part by weight. In this case, physical properties may be improved, and economic efficiency may be improved by reducing manufacturing costs.

Hereinafter, a method of preparing the thermoplastic resin composition of the present invention and a molded article including the thermoplastic resin composition will be described. In describing the method of preparing the thermoplastic resin composition of the present invention and the molded article including the thermoplastic resin composition, all contents of the above-mentioned thermoplastic resin composition are included.

Method of Preparing Thermoplastic Resin Composition

A method of preparing the thermoplastic resin composition of the present invention include a step of kneading and extruding, at 180 to 300° C. and 80 to 400 rpm, an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) including an alkyl (meth)acrylate, an alkyl-substituted styrene-based compound, and a vinyl cyanide compound, wherein the graft copolymer (A) satisfies both Equations 1 and 2 below. In this case, transparency, gloss, heat resistance, and impact resistance may be excellent.

$$180 \leq 2 * r2 \leq 300 \quad \text{[Equation 1]}$$

$$25 \leq r2 - r1 \leq 45 \quad \text{[Equation 2]}$$

In Equations 1 and 2, r1 is the thickness (nm) from the center of the graft copolymer to the polymer seed, and r2 is the thickness (nm) from the center of the graft copolymer to the rubber core.

For example, in the step of kneading and extruding, an alkyl acrylate-aromatic vinyl compound-vinyl cyanide compound graft copolymer (C) containing a rubber core having an average particle diameter of 50 to 150 nm may be included. Preferably, an alkyl acrylate-aromatic vinyl compound-vinyl cyanide compound graft copolymer (C) including a rubber core having an average particle diameter of 50 to 150 nm and including 78 to 91% by weight of an alkyl acrylate and 9 to 22% by weight of an aromatic vinyl compound and a graft shell surrounding the rubber core and including 65 to 80% by weight of an aromatic vinyl compound, 12 to 26% by weight of a vinyl cyanide compound, and 3 to 15% by weight of an alkyl acrylate may be included. In this case, impact resistance may be excellent, and transparency, gloss, blackness, and weather resistance may be greatly improved.

For example, the kneading and extrusion may be performed using a single-screw extruder, a twin-screw extruder, or a Banbury mixer. In this case, since the composition is uniformly dispersed, compatibility may be excellent.

For example, the kneading and extrusion may be performed at a barrel temperature of 180 to 300° C., preferably 190 to 280° C., more preferably 200 to 260° C. In this case, throughput per unit time may be adequate, and melt-kneading may be sufficiently performed. In addition, thermal decomposition of a resin component may be prevented.

For example, the kneading and extrusion may be performed at a screw rotation rate of 80 to 400 rpm, preferably 100 to 300 rpm, more preferably 150 to 250 rpm. In this case, due to appropriate throughput per unit time, process efficiency may be excellent.

For example, the thermoplastic resin composition obtained through extrusion may be made into pellets using a pelletizer.

In addition, the resin composition may be manufactured into molded articles used in various industrial fields through molding processes such as a blow process and an injection process.

Molded Article

For example, a molded article of the present invention may include the thermoplastic resin composition of the present invention. In this case, the molded article may have excellent transparency, gloss, heat resistance, blackness, weather resistance, and impact resistance, and thus may be applied to high-quality products requiring transparency.

For example, the molded article may be an injection-molded article, a film, or a sheet. In this case, by the thermoplastic resin composition of the present invention, impact resistance, transparency, gloss, heat resistance, blackness, and weather resistance beyond the levels required in the market may be provided.

The molded article may be an automotive interior material, an automotive exterior material, a building material, a home appliance, or a medical part. In this case, transparency, gloss, heat resistance, and impact resistance required in the market may be provided.

A method of manufacturing the molded article includes preferably a step of preparing pellets by kneading and extruding, at 180 to 300° C. and 80 to 400 rpm, an alkyl acrylate-aromatic vinyl compound-vinyl cyanide compound graft copolymer (A) including a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate and a non-graft copolymer (B) including an alkyl (meth)acrylate, an alkyl-substituted styrene-based compound, and a vinyl cyanide compound; and a step of injecting or extruding the prepared pellets using an injection machine or an extruder, wherein the graft copolymer (A) satisfies both Equations 1 and 2 below. In this case, the molded article may have excellent transparency, gloss, heat resistance, blackness, weather resistance, and impact resistance, and thus may be applied to high-quality products requiring these properties.

$$180 \leq 2 * r2 \leq 300 \quad \text{[Equation 1]}$$

$$25 \leq r2 - r1 \leq 45 \quad \text{[Equation 2]}$$

In Equations 1 and 2, r1 is the average radius (nm) from the center of the graft copolymer to the polymer seed, and r2 is the average radius (nm) from the center of the graft copolymer to the rubber core.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in examples and comparative examples are as follows.

- Graft copolymer (A): Graft copolymers (A) were prepared in Examples 1 to 10 and Comparative Examples 1 to 11 below.
- AMS T-SAN copolymer (B-1): A methyl methacrylate-α-methyl styrene-acrylonitrile copolymer including 42.5% by weight of methyl methacrylate, 37.5% by weight of α-methyl styrene, and 20% by weight of acrylonitrile
- SAMMA copolymer (B-2): A methyl methacrylate-styrene-acrylonitrile non-graft copolymer including 71% by weight of methyl methacrylate, 22% by weight of styrene, and 7% by weight of acrylonitrile
- Graft copolymer (C): A graft copolymer (rubber core: 45% by weight and graft shell: 55% by weight) including a rubber core including 85% by weight of butyl acrylate and 15% by weight of styrene and having an average particle diameter of 90 mm and a graft shell surrounding the rubber core and including 72% by weight of styrene, 20% by weight of acrylonitrile, and 8% by weight of butyl acrylate
- Lubricant: SUNLUBE EBS (SEONGU Co.)
- Antioxidant: Songnox 1076 (SONGWON Co.) and Irgafos 168 (BASF Co.)
- UV absorber: Tinuvin 770 (BASF Co.), Tinuvin P (BASF Co.)

Example 1

An acrylate-styrene-acrylonitrile graft copolymer (A) was prepared by including 45% by weight of butyl acrylate (hereinafter referred to as "BA") and 55% by weight of styrene (hereinafter referred to as "SM") as a polymer seed; 85% by weight of BA and 15% by weight of SM as a rubber core; and 72% by weight of SM, 20% by weight of acrylonitrile (hereinafter referred to as "AN"), and 8% by weight of BA as a graft shell. At this time, the graft copolymer (A) included 20% by weight of the polymer seed, 40% by weight of the rubber core, and 40% by weight of the graft shell.

50 parts by weight of the prepared graft copolymer (A), 50 parts by weight of the AMS T-SAN copolymer (B-1), 1 part by weight of a lubricant, 1 part by weight of an antioxidant, and 0.6 parts by weight of a UV stabilizer were mixed, and then kneaded and extruded at 220° C. and 200 rpm to prepare pellets. The prepared pellets were injected at a molding temperature of 220° C. to obtain an injection specimen for measuring physical properties. In addition, the prepared pellets were extruded at 220° C. and 200 rpm using a single-screw film extruder to obtain an extrusion specimen for measuring physical properties.

Examples 2 to 5 and Examples 8 to 10

The same procedure as in Example 1 was performed except that graft copolymers (A) polymerized according to the components and contents shown in Tables 1 and 2 below were used instead of the graft copolymer (A) of Example 1.

Example 6

The same procedure as in Example 1 was performed except that 30 parts by weight of the graft copolymer (A) and 20 parts by weight of the graft copolymer (C) were used instead of 50 parts by weight of the graft copolymer (A) prepared in Example 1.

Example 7

The same procedure as in Example 1 was performed except that 35 parts by weight of the graft copolymer (A) and 15 parts by weight of the graft copolymer (C) were used instead of 50 parts by weight of the graft copolymer (A) prepared Example 1.

Comparative Examples 1 to 9

The same procedure as in Example 1 was performed except that graft copolymers (A) polymerized according to the components and contents shown in Tables 3 and 4 below were used instead of the graft copolymer (A) of Example 1.

Comparative Example 10

The same procedure as in Example 1 was performed except that a graft copolymer was prepared by including 100% by weight of BA as the polymer seed; 81% by weight of BA and 19% by weight of SM as the rubber core; and 100% by weight of methyl methacrylate (hereinafter referred to as "MMA") as the graft shell.

Comparative Example 11

The same procedure as in Example 1 was performed except that the SAMMA copolymer (B-2) was used instead of the AMS T-SAN copolymer (B-1) of Example 1.

Test Examples

The properties of the pellets and specimens prepared in Examples 1 to 10 and Comparative Examples 1 to 11 were measured by the following methods, and the results are shown in Tables 1 to 4 below.

The refractive indexes of the seed, core, and shell of the graft copolymer (A) and the refractive index of the non-graft copolymer (B) were calculated by Equation 3 below.

$$RI = \sum Wti * RIi \quad \text{[Equation 3]}$$

Wti=Weight fraction (%) of each component in copolymer

RIi=Refractive index of polymer of each component of copolymer

Average particle diameters (nm) of polymer seed, rubber core, and graft shell: For each of the polymer seed, the rubber core, and the graft shell, upon completion of preparation thereof, a sample was obtained, and the average particle diameter of the sample was measured by dynamic light scattering. Specifically, the average particle diameter was measured as an intensity value using a Nicomp 380 particle size analyzer (manufacturer: PSS) in a Gaussian mode. As a specific measurement example, a sample was prepared by diluting 0.1 g of latex (total solids content: 35 to 50 wt %) 1,000 to 5,000-fold with distilled water. Then, the average particle diameter of the sample was measured using a flow cell in auto-dilution in a measurement mode of dynamic light scattering/intensity 300 kHz/intensity-weight Gaussian analysis. At this time, setting values were as follows: temperature: 23° C. and measurement wavelength: 632.8 nm.

For reference, r1 is a value obtained by dividing the average particle diameter of the seed by half, and r2 is a value obtained by dividing the average particle diameter of the core including the seed by half.

Izod impact strength (IMP; kgf·cm/cm): Izod impact strength was measured at room temperature (20±5° C.) using a ¼" thick injection specimen according to ASTM D256.

Haze (%): Haze values of a 3 mm thick injection specimen and a 0.15 mm thick extrusion specimen were measured according to ASTM D1003. As haze decreases, transparency increases.

Gloss of injection specimen: Gloss was measured at 450 using an injection specimen having a thickness of 3 mm according to ASTM D2457.

Gloss of extrusion specimen: Gloss was measured at 60° using an extrusion specimen having a thickness of 0.15 mm according to ASTM D2457.

Heat deflection temperature (HDT, ° C.): Heat deflection temperature was measured under a load of 18.5 kgf according to STM D648.

Vicat softening temperature (° C.): Vicat softening temperature was measured at a heating rate of 50° C./min under a load of 50 N according to ASTM D1525.

Refractive index difference between sol and gel in thermoplastic resin composition: 30 g of acetone was added to 0.5 g of thermoplastic resin composition pellets, stirring was performed at 210 rpm and room temperature for 12 hours using a shaker (SKC-6075, Lab Companion Co.), and centrifugation was performed at 18,000 rpm and 0° C. for 3 hours using a centrifuge (Supra R30, Hanil Science Co.) to separate a gel insoluble in acetone and a sol soluble in acetone. Then, the gel and the sol were dried via forced circulation at 85° C. for 12 hours using a forced convection oven (OF-12GW, Lab Companion Co.), and the refractive indexes of the gel and the sol were measured at room temperature (20±5° C.) using an Abbe refractometer according to ASTM D542. Then, a difference in the refractive indexes was calculated.

Weather resistance (ΔE) After leaving an specimen for 3,000 hours in an accelerated weathering tester (Weather-O-Meter, Ci4000, ATLAS Co., xenon arc lamp, Quartz (inner)/S.Boro (outer) filters, irradiance of 0.55 W/m$^2$ at 340 nm) according to SAE J1960, the degree of discoloration was measured using a color difference meter, and weather resistance (ΔE) was calculated by Equation 7 below. ΔE below is an arithmetic mean value of L, a, and b values of the specimen measured by the CIE LAB color coordinate system before and after the accelerated weathering test. Weather resistance increases as the value of ΔE approaches zero.

$$\Delta E = \sqrt{(L' - L_0)^2 + (a' - a_0)^2 + (b' - b_0)^2} \quad \text{[Equation 7]}$$

In Equation 7, L', a', and b' represent L, a, and b values measured using the CIE LAB color coordinate system after leaving a specimen for 3,000 hours according to SAE J1960, respectively. $L_0$, $a_0$, and $b_0$ represent L, a, and b values measured using the CIE LAB color coordinate system before leaving the specimen, respectively.

Blackness (L): Among values measured for the color of an injection specimen using the CIE LAB color coordinate system, blackness was evaluated by an L value corresponding to brightness. The L value has a value between 0 and 100. L=0 indicates black, and L=100 indicates white.

TABLE 1

| Classification | | | Example 1 | Example 2 | Example 3 | Example 4 | Example 5 |
|---|---|---|---|---|---|---|---|
| (A) Graft copolymer | Seed | BA/SM (wt %) | 45/55 | 47/53 | 42/58 | 40/60 | 40/60 |
| | Core | BA/SM (wt %) | 85/15 | 85/15 | 85/15 | 85/15 | 87/13 |
| | Shell | SM/AN/BA (wt %) | 72/20/8 | 72/20/8 | 72/20/8 | 72/20/8 | 71/18/11 |
| | 2*r2 (nm) | | 240 | 240 | 240 | 240 | 240 |
| | r2 − r1 (nm) | | 35 | 35 | 35 | 35 | 35 |
| | Refractive index difference between core and shell | | 0.086 | 0.086 | 0.086 | 0.086 | 0.086 |
| Thermoplastic resin composition | (A) Graft copolymer (wt %) | | 50 | 50 | 50 | 50 | 50 |
| | (B-1) AMS T-SAN copolymer (wt %) | | 50 | 50 | 50 | 50 | 50 |
| | (C) Graft copolymer (wt %) | | — | — | — | — | — |
| Refractive index difference between seed of graft copolymer (A) and non-graft copolymer (B) | | | 0.002 | 0.004 | 0.002 | 0.005 | 0.005 |
| Injection specimen | | Haze (%) | 4 | 4.6 | 4.1 | 4.7 | 4.8 |
| | | Impact strength (kgf · cm/cm) | 15.3 | 14.4 | 14.4 | 15.6 | 13.7 |
| | | Gloss | 132 | 133 | 138 | 141 | 142 |
| | | HDT (° C.) | 88.7 | 89.3 | 89.5 | 88.3 | 88.9 |
| | | Vicat (° C.) | 89.5 | 90.2 | 90.8 | 89.5 | 89.9 |
| | | Blackness (L) | 24.2 | 24.5 | 24.4 | 24.7 | 24.3 |
| | | Weather resistance (ΔE) | 2.2 | 2.1 | 2.4 | 2.7 | 2.4 |
| Extrusion specimen | | Haze (%) | 1.6 | 2.1 | 1.8 | 2 | 2.1 |
| | | Gloss | 121 | 123 | 130 | 133 | 132 |
| Refractive index difference between sol and gel in thermoplastic resin composition | | | 0.0023 | 0.0025 | 0.0021 | 0.0021 | 0.0019 |

TABLE 2

| Classification | | | Example 6 | Example 7 | Example 8 | Example 9 | Example 10 |
|---|---|---|---|---|---|---|---|
| (A) Graft copolymer | Seed | BA/SM (wt %) | 40/60 | 40/60 | 40/60 | 40/60 | 40/60 |
| | Core | BA/SM (wt %) | 87/13 | 87/13 | 87/13 | 87/13 | 87/13 |
| | Shell | SM/AN/BA (wt %) | 71/18/11 | 71/18/11 | 74/16/10 | 71/24/5 | 69/22/9 |
| | 2*r2 (nm) | | 240 | 240 | 240 | 240 | 240 |
| | r2 − r1 (nm) | | 35 | 35 | 35 | 35 | 35 |
| | Refractive index difference between core and shell | | 0.086 | 0.086 | 0.089 | 0.089 | 0.086 |

TABLE 2-continued

| Classification | | | Example 6 | Example 7 | Example 8 | Example 9 | Example 10 |
|---|---|---|---|---|---|---|---|
| Thermoplastic resin composition | (A) Graft copolymer (wt %) | | 30 | 35 | 50 | 50 | 50 |
| | (B-1) AMS T-SAN copolymer (wt %) | | 50 | 50 | 50 | 50 | 50 |
| | (C) Graft copolymer (wt %) | | 20 | 15 | — | — | — |
| Refractive index difference between seed of graft copolymer (A) and non-graft copolymer (B) | | | 0.005 | 0.005 | 0.005 | 0.005 | 0.005 |
| Injection specimen | | Haze (%) | 4.6 | 4.8 | 4.7 | 4.7 | 4.6 |
| | | Impact strength (kgf · cm/cm) | 13.1 | 14.2 | 15 | 14.1 | 14.3 |
| | | Gloss | 140 | 139 | 141 | 137 | 132 |
| | | HDT (° C.) | 90.2 | 90 | 90 | 89.5 | 89.7 |
| | | Vicat (° C.) | 91.1 | 91.2 | 91 | 91.2 | 90.7 |
| | | Blackness (L) | 24.9 | 24.9 | 24.8 | 24.5 | 24.5 |
| | | Weather resistance (ΔE) | 2.3 | 2.6 | 2.4 | 2.7 | 2.6 |
| Extrusion specimen | | Haze (%) | 2.2 | 2.2 | 2.1 | 2.2 | 2.1 |
| | | Gloss | 132 | 133 | 135 | 130 | 127 |
| Refractive index difference between sol and gel in thermoplastic resin composition | | | 0.0019 | 0.0019 | 0.0023 | 0.0019 | 0.0017 |

TABLE 3

| Classification | | | Comparative Example 1 | Comparative Example 2 | Comparative Example 3 | Comparative Example 4 | Comparative Example 5 | Comparative Example 6 |
|---|---|---|---|---|---|---|---|---|
| (A) Graft copolymer | Seed | BA/SM (wt %) | 30/70 | 70/30 | 45/55 | 45/55 | 45/55 | 45/55 |
| | Core | BA/SM (wt %) | 85/15 | 85/15 | 95/5 | 70/30 | 85/15 | 85/15 |
| | Shell | SM/AN/BA (wt %) | 72/20/8 | 72/20/8 | 72/20/8 | 72/20/8 | 72/8/20 | 75/25/0 |
| | 2*r2 (nm) | | 240 | 240 | 240 | 240 | 240 | 240 |
| | r2 − r1 (nm) | | 35 | 35 | 35 | 35 | 35 | 35 |
| | Refractive index difference between core and shell | | 0.086 | 0.086 | 0.099 | 0.066 | 0.079 | 0.093 |
| Thermoplastic resin composition | (A) Graft copolymer (wt %) | | 50 | 50 | 50 | 50 | 50 | 50 |
| | (B-1) AMS T-SAN copolymer (wt %) | | 50 | 50 | 50 | 50 | 50 | 50 |
| | (C) Graft copolymer (wt %) | | — | — | — | — | — | — |
| Refractive index difference between seed of graft copolymer (A) and non-graft copolymer (B) | | | 0.018 | 0.034 | 0.002 | 0.002 | 0.002 | 0.002 |
| Injection specimen | | Haze (%) | 35.8 | 62.7 | 51.9 | 44.9 | 48.2 | 50.5 |
| | | Impact strength (kgf · cm/cm) | 7.2 | 9.3 | 14.2 | 7.4 | 9.3 | 15.4 |
| | | Gloss | 102 | 109 | 105 | 107 | 101 | 105 |
| | | HDT (° C.) | 88.6 | 88.8 | 88.3 | 88.9 | 90.1 | 89.2 |
| | | Vicat (° C.) | 89.6 | 89.9 | 89.5 | 90.4 | 91.2 | 90.9 |
| | | Blackness (L) | 25.4 | 25.7 | 25.6 | 25.7 | 26.4 | 26.0 |
| | | Weather resistance (ΔE) | 3.2 | 3.2 | 3.5 | 3.0 | 3.0 | 3.1 |
| Extrusion specimen | | Haze (%) | 2.9 | 5.2 | 4.9 | 4.3 | 4.7 | 4.6 |
| | | Gloss | 91 | 96 | 92 | 93 | 93 | 94 |
| Refractive index difference between sol and gel in thermoplastic resin composition | | | 0.0199 | 0.0017 | 0.0157 | 0.0211 | 0.0098 | 0.0100 |

TABLE 4

| Classification | | Comparative Example 7 | Comparative Example 8 | Comparative Example 9 | Comparative Example 10 | Comparative Example 11 |
|---|---|---|---|---|---|---|
| (A) Graft copolymer | Seed BA/SM (wt %) | 45/55 | 45/55 | 0/100 | 100/0 | 45/55 |
| | Core BA/SM (wt %) | 85/15 | 85/15 | 100/0 | 81/19 | 85/15 |
| | Shell SM/AN/BA (wt %) | 72/20/8 | 72/20/8 | 75/25/0 | 100 (MMA) | 72/20/8 |
| | 2*r2 (nm) | 360 | 160 | 230 | 240 | 240 |
| | r2 − r1 (nm) | 52 | 23 | 40 | 35 | 35 |
| | Refractive index difference between core and shell | 0.086 | 0.086 | 0.112 | 0.005 | 0.086 |
| Thermoplastic resin composition | (A) Graft copolymer (wt %) | 50 | 50 | 50 | 50 | 50 |
| | (B-1) AMS T-SAN copolymer (wt %) | 50 | 50 | 50 | 50 | — |
| | (B-2) SAMMA copolymer (wt %) | — | — | — | — | 50 |
| | (C) Graft copolymer (wt %) | — | — | — | — | — |
| Refractive index difference between seed of graft copolymer (A) and non-graft copolymer (B) | | 0.002 | 0.002 | 0.057 | 0.073 | 0.016 |
| Injection specimen | Haze (%) | 16.8 | 4.3 | 68.9 | 75.8 | 34.6 |
| | Impact strength (kgf · cm/cm) | 16.4 | 6.1 | 13.2 | 8.1 | 9.2 |
| | Gloss | 110 | 141 | 99 | 100 | 105 |
| | HDT (° C.) | 88.9 | 88.7 | 89.3 | 89.2 | 71.3 |
| | Vicat (° C.) | 90.6 | 90.3 | 90.7 | 90.5 | 79.2 |
| | Blackness (L) | 27.2 | 26.9 | 25.8 | 25.7 | 26.7 |
| | Weather resistance (ΔE) | 3.4 | 3.1 | 3.3 | 3.2 | 3.1 |
| Extrusion specimen | Haze (%) | 3.2 | 1.9 | 5.9 | 6.2 | 2.8 |
| | Gloss | 100 | 123 | 91 | 89 | 92 |
| Refractive index difference between sol and gel in thermoplastic resin composition | | 0.0021 | 0.0023 | 0.0491 | 0.0512 | 0.0020 |

As shown in Tables 1 to 4, compared to Comparative Examples 1 to 11, the thermoplastic resin compositions (Examples 1 to 10) according to the present invention have excellent impact strength, haze, gloss, heat deflection temperature, Vicat softening temperature, weather resistance, and blackness.

In particular, Examples 6 and 7 including the graft copolymer (C) exhibit excellent gloss, heat deflection temperature, and Vicat softening temperature.

On the other hand, in the case of Comparative Examples 1 and 2 in which the composition ratio of the polymer seed of the graft copolymer (A) is outside the range of the present invention, the refractive index difference between the seed of the graft copolymer (A) and the AMS T-SAN copolymer (B-1) and/or the refractive index difference between a sol and a gel in the thermoplastic resin composition are large. As a result, haze and/or gloss are reduced, and weather resistance deteriorates. In particular, in the case of Comparative Example 1, impact strength is greatly reduced.

In addition, in the case of Comparative Examples 3 and 4 in which the composition ratio of the rubber core of the graft copolymer (A) is outside of the range of the present invention, the refractive index difference between a sol and a gel in the thermoplastic resin composition is large. As a result, haze and gloss are reduced, and weather resistance is poor. In particular, in the case of Comparative Example 4, impact strength is also greatly reduced.

In addition, in the case of Comparative Examples 5 and 6 in which the composition ratio of the graft shell of the graft copolymer (A) is outside of the range of the present invention, the refractive index difference between a sol and a gel in the thermoplastic resin composition is large. As a result, haze, gloss, blackness, and weather resistance are poor. In particular, in the case of Comparative Example 5, impact strength is also reduced.

In addition, in the case of Comparative Example 7 in which the 2*r2 and r2-r1 of the rubber core of the graft copolymer (A) exceed the range of the present invention, the injection specimen has poor haze, gloss, blackness, and weather resistance, and the extrusion specimen has low gloss.

In addition, in the case of Comparative Example 8 in which the 2*r2 and r2-r1 of the rubber core of the graft copolymer (A) are less than the range of the present invention, impact strength is greatly reduced, and blackness and weather resistance are poor.

In addition, in the case of Comparative Example 9 in which styrene is included in the seed, butyl acrylate is included in the core, and styrene and acrylonitrile are included in the shell as in the conventional technique, the refractive index difference between the core of the graft copolymer (A) and the polymer seed, the refractive index difference between the polymer seed of the graft copolymer (A) and the AMS T-SAN copolymer (B-1), and the refractive index difference between a sol and a gel in the thermoplastic resin composition are large. As a result, haze and gloss are very poor, and blackness and weather resistance are also poor.

In addition, in the case of Comparative Example 10 including butyl acrylate as the seed of the graft copolymer (A) and methyl methacrylate as the shell, the refractive index difference between the seed of the graft copolymer (A) and the AMS T-SAN copolymer (B-1) and the refractive index difference between a sol and a gel in the thermoplastic resin composition are large. As a result, haze, gloss, impact strength, blackness, and weather resistance are poor.

In addition, in the case of Comparative Example 11 in which the SAMMA copolymer (B-2) is used instead of the AMS T-SAN copolymer (B-1), the refractive index difference between the polymer seed of the graft copolymer (A) and the SAMMA copolymer (B-2) is large. As a result, haze, gloss, blackness, weather resistance, and/or impact strength are poor, and heat deflection temperature and Vicat softening temperature are greatly reduced.

In conclusion, in the thermoplastic resin composition including the alkyl acrylate-aromatic vinyl compound-vinyl cyanide compound graft copolymer (A) according to the present invention and the non-graft copolymer (B) including an alkyl (meth)acrylate, an alkyl-substituted styrene-based compound, and a vinyl cyanide compound, when the composition ratio of the polymer seed, core, and shell constituting the graft copolymer (A) is adjusted within a predetermined range, and the refractive index difference between the core and the shell and the refractive index difference between the polymer seed of the graft copolymer (A) and the non-graft copolymer (B) are reduced, impact resistance, transparency, gloss, and heat resistance may be excellent.

The invention claimed is:

1. A thermoplastic resin composition, comprising:

an alkyl acrylate-aromatic vinyl compound-vinyl cyanide compound graft copolymer (A) comprising a seed, a rubber core surrounding the seed, and a graft shell surrounding the rubber core; and a non-graft copolymer (B) comprising an alkyl (meth) acrylate, an alkyl-substituted styrene-based compound, and a vinyl cyanide compound, wherein the graft copolymer (A) satisfies Equation 1 below;

when acetone is added to the thermoplastic resin composition and stirring and centrifugation are performed so that the thermoplastic resin composition is separated into a sol and a gel, a refractive index difference between the sol and the gel is 0.006 or less;

the thermoplastic resin composition has a haze of 10% or less as measured using a 3 mm thick injection specimen according to ASTM D1003; and the thermoplastic resin composition has an Izod impact strength of 10 kgf cm/cm or more as measured at room temperature using a ¼" thick specimen according to ASTM D256:

$$180 \leq 2 * r2 \leq 300, \quad \text{[Equation 1]}$$

wherein r2 is a thickness (nm) from a center of the graft copolymer to the core.

2. A thermoplastic resin composition, comprising:

an alkyl acrylate-aromatic vinyl compound-vinyl cyanide compound graft copolymer (A) comprising a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) comprising an alkyl (meth) acrylate, an alkyl-substituted styrene-based compound, and a vinyl cyanide compound, wherein the graft copolymer (A) satisfies both Equations 1 and 2 below:

$$180 \leq 2 * r2 \leq 300 \quad \text{[Equation 1]}$$

$$25 \leq r2 - r1 \leq 45, \quad \text{[Equation 2]}$$

wherein, in Equations 1 and 2, r1 is a thickness (nm) from a center of the graft copolymer to the seed, and r2 is a thickness (nm) from a center of the graft copolymer to the core.

3. The thermoplastic resin composition according to claim 1, wherein, in the graft copolymer (A), a refractive index difference between the rubber core and the graft shell is 0.09 or less.

4. The thermoplastic resin composition according to claim 1, wherein a refractive index difference between the seed of the graft copolymer (A) and the non-graft copolymer (B) is 0.012 or less.

5. The thermoplastic resin composition according to claim 1, wherein, based on 100% by weight in total of the graft copolymer (A), the graft copolymer (A) comprises 5 to 35% by weight of the seed, 25 to 55% by weight of the rubber core, and 25 to 55% by weight of the graft shell.

6. The thermoplastic resin composition according to claim 1, wherein the non-graft copolymer (B) comprises 30 to 60% by weight of the alkyl (meth)acrylate, 25 to 55% by weight of the alkyl-substituted styrene-based compound, and 5 to 35% by weight of the vinyl cyanide compound.

7. The thermoplastic resin composition according to claim 1, wherein the thermoplastic resin composition further comprises 10 to 90% by weight of the graft copolymer (A) and 10 to 90% by weight of the non-graft copolymer (B).

8. The thermoplastic resin composition according to claim 1, wherein the thermoplastic resin composition further comprises an alkyl acrylate-aromatic vinyl compound-vinyl cyanide compound graft copolymer (C) containing a rubber core having an average particle diameter of 50 to 150 nm.

9. The thermoplastic resin composition according to claim 2, wherein, when acetone is added to the thermoplastic resin composition and stirring and centrifugation are performed so that the thermoplastic resin composition is separated into a sol and a gel, a refractive index difference between the sol and the gel is 0.006 or less.

10. The thermoplastic resin composition according to claim 2, wherein the thermoplastic resin composition has a haze of 10% or less as measured using a 3 mm thick injection specimen according to ASTM D1003.

11. The thermoplastic resin composition according to claim 2, wherein the thermoplastic resin composition has a gloss of 120 or more as measured at 45° using a 3 mm thick injection specimen according to ASTM D2457.

12. The thermoplastic resin composition according to claim 2, wherein the thermoplastic resin composition has an Izod impact strength of 10 kgf cm/cm or more as measured at room temperature using a ¼" thick specimen according to ASTM D256.

13. A method of preparing a thermoplastic resin composition, comprising kneading and extruding, at 180 to 300° C. and 80 to 400 rpm, an alkyl acrylate-aromatic vinyl compound-vinyl cyanide compound graft copolymer (A) comprising a seed obtained by polymerizing 35 to 58% by weight of an alkyl acrylate and 42 to 65% by weight of an aromatic vinyl compound, a rubber core formed to surround the seed and obtained by polymerizing 78 to 91% by weight of an alkyl acrylate and 9 to 22% by weight of an aromatic vinyl compound, and a graft shell formed to surround the rubber core and obtained by polymerizing 65 to 82% by weight of an aromatic vinyl compound, 12 to 30% by weight of a vinyl cyanide compound, and 3 to 15% by weight of an alkyl acrylate; and a non-graft copolymer (B) comprising an alkyl (meth)acrylate, an alkyl-substituted styrene-based compound, and a vinyl cyanide compound, wherein the graft copolymer (A) satisfies both Equations 1 and 2 below:

$$180 \leq 2 * r2 \leq 300 \quad \text{[Equation 1]}$$

$$25 \leq r2 - r1 \leq 45, \quad \text{[Equation 2]}$$

wherein, in Equations 1 and 2, r1 is a thickness (nm) from a center of the graft copolymer to the seed, and r2 is a thickness (nm) from a center of the graft copolymer to the core.

14. The method according to claim 13, wherein, in the kneading and extruding, an alkyl acrylate-aromatic vinyl compound-vinyl cyanide compound graft copolymer (C) containing a rubber core having an average particle diameter of 50 to 150 nm is comprised.

15. A molded article, comprising the thermoplastic resin composition according to claim 2.

* * * * *